April 30, 1935.  I. E. McCABE  1,999,882
CIRCUIT CONTROL SYSTEM
Original Filed April 23, 1930  4 Sheets-Sheet 1

NORMAL IDLE POSITION

INVENTOR
IRA E. McCABE
BY Langdon Moore
ATTORNEY

INVENTOR.
IRA E. McCABE
BY Langdon Moore
ATTORNEY.

April 30, 1935. I. E. McCABE 1,999,882
CIRCUIT CONTROL SYSTEM
Original Filed April 23, 1930   4 Sheets-Sheet 4
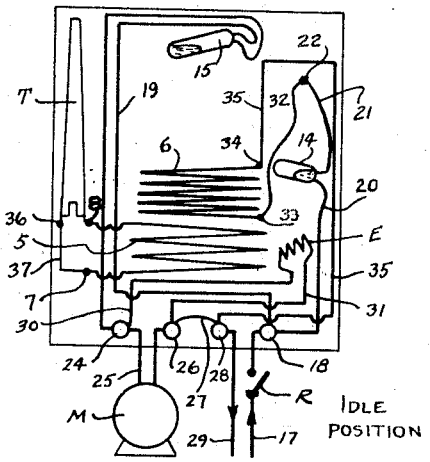
Fig. 7 — Idle Position
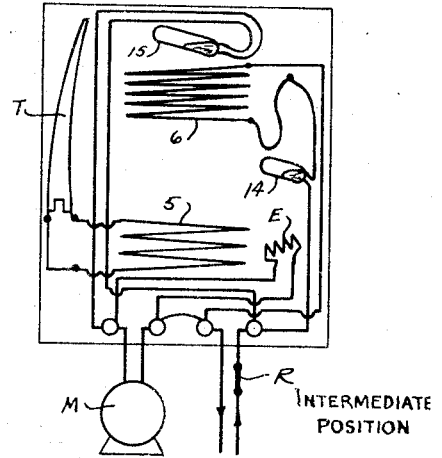
Fig. 8 — Intermediate Position
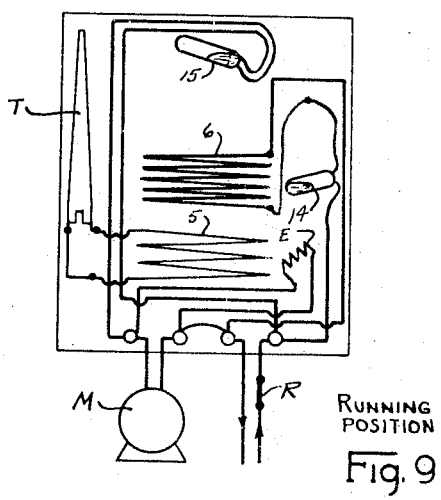
Fig. 9 — Running Position
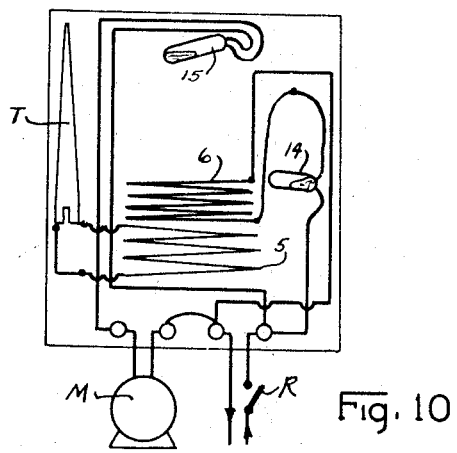
Fig. 10
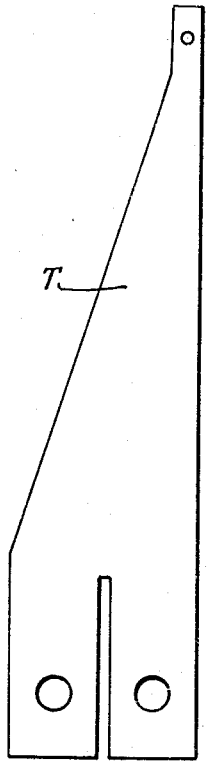
Fig. 6
INVENTOR.
IRA E McCABE
BY Langdon Moore
ATTORNEY Patented Apr. 30, 1935

1,999,882

UNITED STATES PATENT OFFICE 1,999,882

CIRCUIT CONTROL SYSTEM

Ira E. McCabe, Chicago, Ill.

Original application April 23, 1930, Serial No. 446,573, now Patent No. 1,881,321, dated October 4, 1932. Divided and this application October 3, 1932, Serial No. 635,917

16 Claims. (Cl. 175—294)

This invention relates to improvements in electrical control devices and more particularly to a circuit control system especially adapted for electrically operated or actuated mechanisms and is a division of my prior application, Serial No. 446,573, filed April 23, 1930 which became Patent No. 1,881,321, October 4, 1932.

The device contemplated in its simplest form provides means for controlling the operation of an electric motor or any other device operated by the passage of an electric current therethrough as described herein. By including a room thermostat, an electrical ignition device and a thermally actuated switch responsive to combustion conditions in circuit with the respective elements, this device may be adapted to automatically control the safe operation of a fluid fuel burner, as disclosed in the parent application which matured October 4, 1932, into Patent No. 1,881,321 above referred to.

It is an object of this invention to interpose in the operating circuit, such as supplied from a commercial source to an electric motor, or other electrically operated device, a control actuated by the closing of said circuit and the passage of the current through the control to operate the control mechanism to close the switch to continue the circuit to the motor or other device, lock said switch closed as long as the line switch is closed and the current is continued from the source, and upon the opening of the line switch to open said motor switch and hold it in the open position until the line switch is again closed. It is a further object to provide in this control mechanism, where it is desirable to delay the operation of the motor or other device for a predetermined period means to accomplish such delay and also means for providing a predetermined intermittent operation of the motor or other device when desired.

With these and other objects in view reference is made to the accompanying sheets of drawings illustrating a preferred embodiment of this invention, with the understanding that minor changes may be made without departing from the scope thereof.

In the drawings—

Figure 6 is a detail view of the thermal strip.

Figure 7 is a schematic wiring diagram showing the parts of the control in the idle position.

Figure 8 is a similar view showing the parts in the intermediate position between idle and running.

Figure 9 is a similar view showing the parts in the normal running position.

Figure 10 is a similar view of a modified form for intermittent motor operation.

Figure 1:
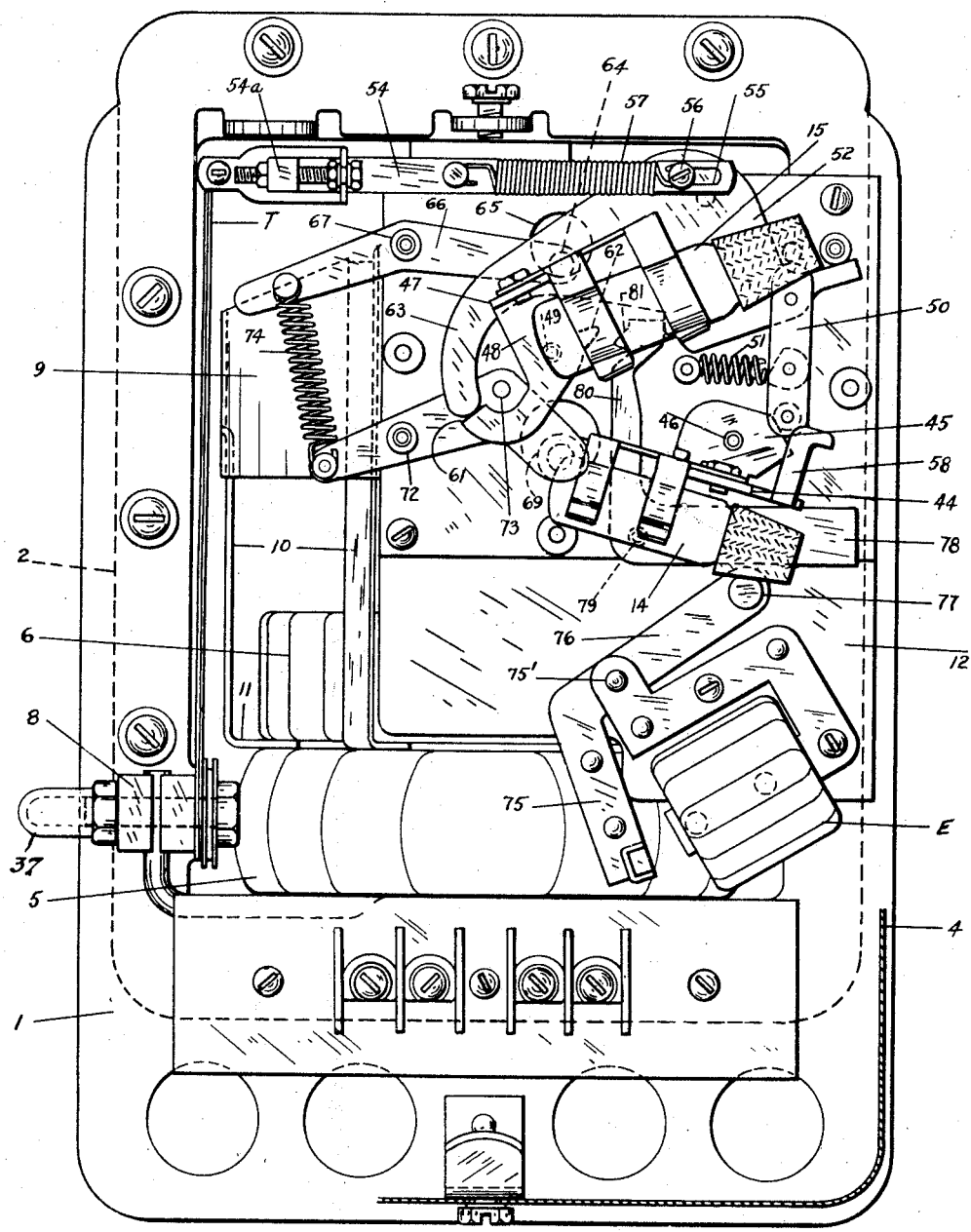
Figure 1 is a view in front elevation of the control panel, with the cover and front plate removed, of a preferred embodiment of this invention, showing the positions assumed by the respective parts when the motor is idle.
Figure 2:
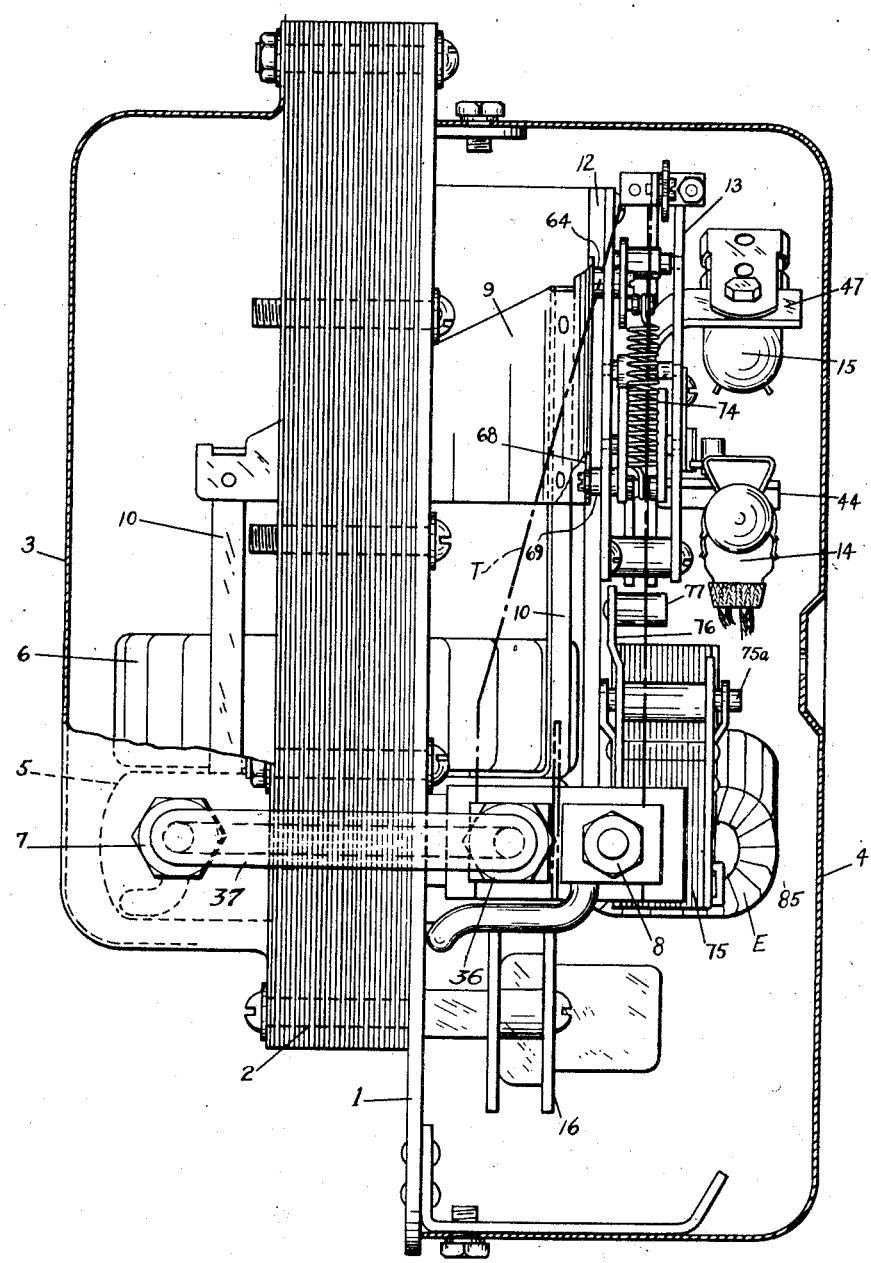
Figure 2 is a view in side elevation of the control panel, looking to the right of Figure 1, with the covers shown in section and the thermal strip shown in dot and dash lines.

Referring to Figures 1 and 2, one preferred form of this invention comprises a panel 1 for mounting the control mechanism which includes a constant current transformer, such as disclosed in this applicant's prior copending application Serial No. 331,542, filed January 10, 1929, in which the rectangular core 2 is mounted on the rear side of the panel 1, the body of the panel is cut out following the outline of the inner edges of the core 2 and the rear of the core 2 is provided with a cover 3. The mechanism on the front of the panel is protected by a cover 4 attached to the panel.

The secondary coil 5 of the constant current transformer is stationary and rests upon the bottom portion of the rectangular core 2, as shown, while the primary coil 6 is mounted thereabove and is adapted to float thereabove when energized. The respective terminals of the secondary coil 5 are connected to binding posts 7 and 8, respectively, arranged on the same side of the coil and opposite sides of the panel 1 and are adapted to be connected in circuit in a manner hereinafter described in detail.

A yoke 9 in the form of a cylinder, or partial cylinder, corresponding in outline to the outline of the primary coil 6 is mounted to reciprocate in the opening in the panel 1 and within the rectangular core 2 and is provided with a plurality of depending legs 10 each having an in-turned foot 11 adapted to enter between the coils 5 and 6.

The switch operating and actuating mechanism is mounted on a base plate 12 supported upon the panel 1 spaced apart a sufficient distance therefrom to allow movement of both the primary coil 6 and yoke 9 therebehind. A front plate 13, shown in Figure 2, covers part of the moving parts and is therefore omitted from the other views so as to not obscure or confuse the movements illustrated therein. The base plate 12 pivotally mounts, in a manner hereinafter described, an actuator switch 14 and a motor switch 15, both shown in full lines in Figures 1 and 2, and omitted from the other views to avoid confusion with the moving parts therebehind. These switches 14 and 15 are preferably mercury tube switches of the commercial type shown.

Referring to Figure 1 and the wiring diagrams of Figures 7, 8, and 9, it is seen that a series of binding posts are arranged in line upon a plate 16 spaced apart from the panel 1 below the fixed secondary coil 5. The lead 17 from the commercial line is connected to the binding post 18 which post is connected by lead 19 to the motor switch 15 and also by lead 20 to the actuator switch 14 and also by lead 21 to binding post 22. The incoming current passing through lead 17 from the commercial line, binding post 18 and lead 19 to the motor switch 15 when the switch is closed passes therefrom through lead 23 to binding post 24 and from thence through lead 25 through mechanism motor M to binding post 26 which is connected by lead 27 to the binding post 28 connected to the return lead 29 to the commercial line. The incoming current at binding post 24 is caused to branch so that a portion passes through lead 30 to energize the windings of electromagnet E by lead 31 to binding post 26 to return lead 29 to the commercial line. The incoming current passing from binding post 18 through lead 20, to the actuator switch 14 passes therethrough, when closed, by way of a flexible lead 32 to one terminal 33 of the windings of the primary coil 6, through said windings to the other terminal 34 and from thence through a flexible lead 35 to binding post 28 and from there to return lead 29 of the commercial line.

The thermal operator circuit remains to be traced upon the diagram on Figure 7. Figure 2 shows one terminal of the windings of the stationary secondary coil attached to binding post 7 and the other terminal of the windings attached to binding post 8. Figure 2 also shows the binding post also engaging one leg of a bifurcated thermal operator member T, illustrated in dot and dash lines, and which is shown in detail in Figure 6 and will be more fully described hereinafter. The other leg of this member T is engaged by the binding post 36 insulated from binding post 8. The thermal operator circuit is completed by way of lead 37 from binding post 7 to binding post 36 and from thence through the legs of the bifurcated thermal member T to binding post 8. Binding posts 7 and 36 are shown only on Figure 2 as they both lie back of binding post 8 on Figure 1. When applied to an oil burner control the electrical ignition device therefore may be connected between binding posts 7 and 36, as disclosed in applicant's said Patent No. 1,881,321.

The actuator switch 14 is preferably mounted in clips depending from a right angular extension 44 from the bottom of a carrier plate 45 mounted on a pivot pin 46 carried by the base plate 12. The motor switch 15 is similarly mounted in clips depending from a right angular extension 47 from the top of a carrier plate 48 mounted on a pivot pin 49 carried on the base plate 12. These switches are so arranged that when the mechanism is not operating or in the idle position, the actuator switch normally assumes a closed position and the motor switch an open position, as shown in Figure 1. When a room thermostat or other remote control switch R closes the circuit from the commercial line through the control and causes the mechanism to operate normally, the switches are caused to assume the running position, shown in Figure 3, with the actuator switch 14 open and the motor switch 15 closed.

In this control, the actuator switch is normally closed when the motor is idle so that when the switch R closes, the thermal operator device is immediately placed in circuit and then the motor switch is closed and a predetermined time thereafter the actuator switch is opened during normal operation of the control. To accomplish this the following constructions and arrangements of parts are contemplated. As seen from the wiring diagram on Figure 7, when the parts are in the idle position, as shown in Figure 1, the incoming current to binding post 18 cannot pass through lead 19 as the motor switch 15 is open, so it follows through lead 20, through normally closed actuator switch 14, lead 21, binding post 22, lead 32 to terminal 33 of the primary coil 6, passing through the windings to terminal 34, energizing the coil, and through lead 35, binding post 28, to the return lead 29 of the commercial line. The energization of the primary coil 6 energizes the secondary coil 5 and the induced current set up in the secondary passes from binding post 7 by way of lead 37 to binding post 36 and thence through the legs of the bifurcated thermal member T to binding post 8 of the other terminal of the secondary coil.

The completion of the actuator circuit thus described accomplishes two things; first, in energizing the primary coil it causes the coil 6 to float above the stationary secondary coil 5, the position it assumes in floating above the coil 5 depends upon the intensity of the current of the commercial line and in all cases frees the feet 11 of the yoke 9 allowing an upward movement of the yoke as hereinafter described; and second, in passing through the legs of the bifurcated thermal member T it increases the temperature of the body thereof.

The thermal member T is formed of a strip of bi-metallic metal preferably wider at its bifurcated base and tapering thereabove as shown in Figures 2 and 6 and is so constructed and arranged that as the current passes through the legs of the bifurcated portion, the extremities of this portion being each held stationary by binding posts 8 and 36, the body of the member becomes heated and the upper free end is caused to move or bend in the direction of the center of the panel 1. This movement of the free end of the thermal member T is employed to allow motor switch 15 to close and to subsequently trip the actuator switch to the open position.

The actuator switch carrier plate 45 is rotatively mounted on the pin 46 the right hand end of the plate 45 terminating in an angular projection the edges of which present two oppositely sloping surfaces over which an actuating roller carried on the free end of an actuating lever 50 is adapted to travel, the roller being maintained in contact with one sloping edge or the other of the plate by a spring 51. The other end of the actuating lever 50 is pivotally connected to an actuating member 52 in the form of a plate pivotally mounted on the pin 53 carried upon the base plate 12. Movement of the actuating member 52 about its pivot imparts movement to the actuating roller and as it travels over the apex of the nose of the ignition switch carrier plate 45 it snaps into the open or closed position, as the case may be, as disclosed in this applicant's prior Patent No. 1,734,016, dated October 29, 1929.

Figure 3:
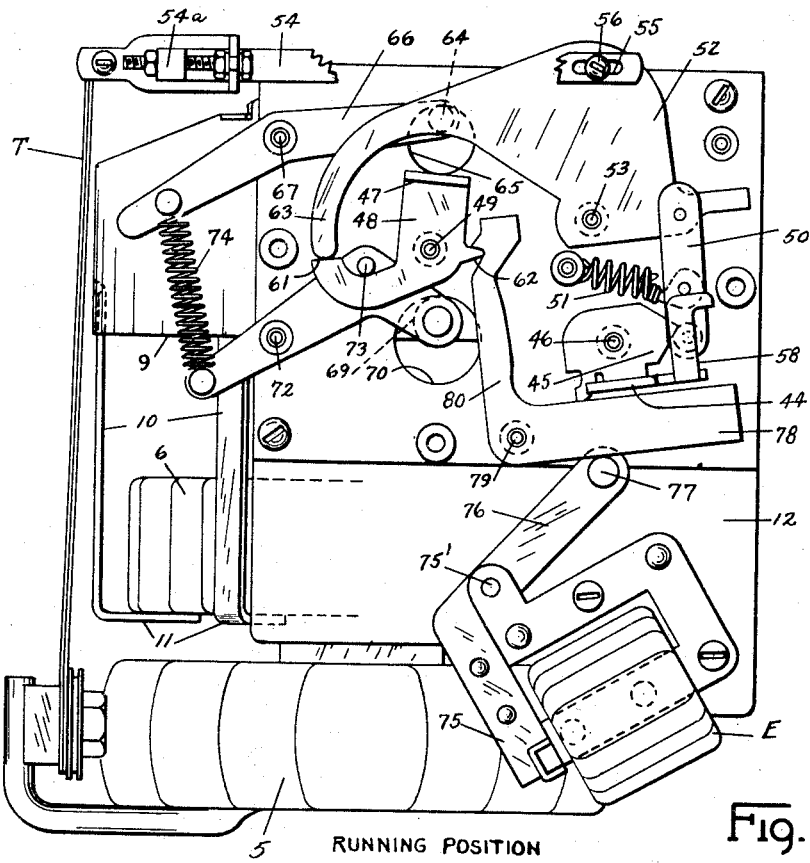
Figure 3 is a fragmentary view similar to Figure 1 illustrating the positions assumed by the respective parts when the motor is normally running.

The free end of the thermal member T is pivotally connected to one end of an adjustable actuating link 54, the other end of which is provided with a slot 55 adapted to receive a pin 56 on the actuating member 52 and engage the pin 56 at the ends of the slot as the link is moved thereover. A coil spring 57 is connected at one end to the pin 56 and at the other end to the body of the link 54 which normally draws the left end of the slot 55 into engagement with the pin 56. These parts are so arranged and adjusted that when the control is in the idle position, as shown in Figure 1, and the actuator switch 14 is closed the actuating roller engages the upper sloping edge of the carrier plate 45 and is held in engagement therewith by the tension of the spring 51 which also through actuating lever 50 imparts a rotative movement to the pivoted actuating member 52 so that the pin 56 thereon engages the left end of the slot 55 of the actuating link 54 and the thermal member T is in vertical position, so that when the actuator circuit is energized the passage of the current thereof through the legs of the thermal member T causing the free end to bend or move toward the center of the panel 1 imparts through actuating link 54 a rotative movement to the right to the pivoted actuating member 52 which in turn imparts a downward movement to the actuating lever 50 causing the actuating roller thereon to travel down the upper sloping surface of the carrier plate 45 and as soon as the roller passes over the apex and engages the under sloping surface snaps the carrier plate 45 about its pivot to open the ignition switch, as shown in Figure 3.

Figures 4, 5:
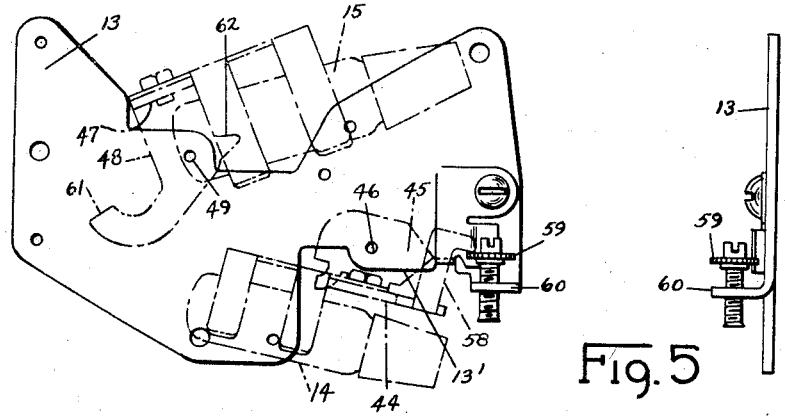
Figure 4 is a detail view in front elevation.
Figure 5 is a similar view in side elevation, of the means for adjusting the delay period.

The period between the closing of the motor circuit and the opening of the actuator switch is predetermined by adjusting the length of the travel of the actuating roller over the upper sloping surface of the carrier plate 45. A means for adjusting the length of the travel is shown in Figures 4 and 5, which includes a hooked latch member 58 mounted to extend upward from the outer side of the right angular extension 44 of the actuator switch carrier plate 45 with the hook of the latch adapted to contact with an adjustable abutment 59 mounted in a right angular struck up portion 60 of the front plate 13 which will limit the downward movement of the carrier plate 45. By raising the abutment 59 the roller is caused to approach the apex and the nearer the actuating roller is to the apex of the sloping surfaces of the carrier plate the less the movement required to snap the actuator switch to the open position and vice versa. As shown in Figure 1, the adjustment is such that the actuating roller is nearly at its upper limit travel and must move over the sloping surface before snapping the actuator switch to the open position. The movement of the actuator carrier plate 45 about its pivot in the opposite direction is limited by upper surface of the angular extension 44, which passes under the front plate 13, engaging with the edge 13' thereof.

When after the control switch R is closed, it is desirous to delay thereafter the time the motor switch is closed to cause the motor to operate this period between the closing of the actuator circuit and the time the motor switch closes is referred to as the delay period. This delay period may be predetermined by the proper adjustment of the length of the actuating link 54, by any desired means, such as the sliding adjustment 54a shown. The greater the travel of the free end of the thermal member T before the actuating link 54 operates the actuating member 52 and arm 63 to allow the motor switch to close, the longer the delay period.

As heretofore stated, the motor switch is mounted on the upper side of a pivotally mounted carrier plate 48, and the portion of this plate below the pivot 49 is extended in a curve downwardly to the left and terminates in an abutment 61, as shown clearly in Figure 1, while the portion on the right, opposite the pivot 49, is provided with an outstanding nose or catch 62, as clearly shown in Figure 3. The actuating member 52 is provided with a curved actuating arm 63 projecting to the left adapted, in the cold position, to engage the abutment 61 of the motor switch carrier plate to tilt the plate about its pivot and hold the motor switch open, as shown in Figure 1.

The upper central portion of the yoke 9 adjacent the rear of the base plate 12 is provided with a fixed pin 64 passing through an opening 65 provided therefore in the base plate 12 the inner end of which is pivotally connected to one end of a lifting lever 66 which lever is mounted intermediate its length upon a pivot 67 mounted adjacent the left edge of the base plate 12. The lower portion of the yoke 9 is provided with a vertical slot 68 in line with the pin 64 adapted to receive and in the idle position engage at its bottom a pin 69, passing through an aperture 70 provided therefor in the base plate 12, carried on a coacting lifting lever 71. This coacting lifting lever 71 is in the shape of a bell crank lever only it is pivoted intermediate the length of the arm opposite that carrying the pin 69 upon a pivot pin 72 mounted adjacent the left edge of the base plate 12 and in line directly below the pivot 67 of the lifting lever 66. The apex of the lever 71 is above its pivot 72 and carries a stud 73 which in the idle position extends over and above the curved extension to the abutment 61 of the motor switch carrier plate 48 and prevents the closing thereof.

The weight of the primary coil is sufficient when in deenergized position upon the feet 11 to hold the yoke 9 with its feet in engagement with the stationary secondary coil 5, as shown in Figure 1. The portions of the lifting lever 66 and coacting lifting lever 71 extend unequally to the left of their respective pivots 67 and 72 while the distance from these pivots to the respective pins 64 and 69 upon the inner ends of the respective levers is the same. As shown in Figure 1, the upper lifting lever 66 extends a greater distance to the left than the lower cooperating lifting lever 71 and the left end portions are connected by a coil spring 74 its upper end being at a greater distance from pivot 67 than the distance of its lower end from pivot 72 so that the tension of the spring will cause an upward movement to be imparted through pin 64 to the yoke 9 when the primary coil 6 is energized and floats above the stationary secondary coil 5. The upward movement of the yoke 9 is limited by its fixed pin 64 engaging the upper side of the aperture 65 in the base plate 12.

The normal voltage of the commercial line circuit is sufficient to cause the primary coil 6 to float above the feet 11 of the yoke 9 as the yoke 9 assumes its upper position in which position it is held during normal operation before the coil 6 is deenergized. To absorb the shock of the falling of the coil 6, when deenergized upon the feet 11, and thereby prevent any undue strains upon any of the parts of the control mechanism, the slot 68 is provided in the yoke 9 to receive the pin 69 and allow a reciprocation of the yoke 9 thereover against the tension of the spring 74.

The upward movement of the yoke 9 changes the relative positions of both lifting lever 66 and coacting lifting lever 71 so that the stud 73 upon lever 71 is moved upward away from the projection of the carrier plate 48. The weight of motor switch being supported to the right of the pivot 49 of its carrier plate would normally rotate the motor switch to closed position but the abutment 61 of the carrier plate engages the arm 63 of the actuating member 52 which remains in the position shown in Figure 1 until the heating of the thermal member T causes it to move about its pivot which raises the end of the actuating arm 63 contacted by the abutment 61, and as this movement takes place the motor switch gradually approaches and finally assumes the closed position shown in Figure 3.

It is therefore seen that the closing of the switch R first energizes the actuator circuit, and the floating of the primary coil 6 and simultaneous heating of the thermal member T coact to first close the motor circuit and then the heating of the thermal member automatically opens the thermal operator circuit. The opening of the thermal operator circuit deenergizes the floating coil 6 and its weight would depress the yoke 9 causing stud 73 upon lever 71 to engage and rotate the motor switch carrier plate 48 to open the motor switch. To prevent such action provision is made to lock the motor switch when once closed and hold it closed during the normal operation of the mechanism, as hereinafter described.

Again referring to the wiring diagram on Figures 7, 8 and 9, it is seen that when the motor switch is closed, the incoming current at binding post 18 branches and part passes through lead 19, closed motor switch 15, lead 25, motor M, binding post 26, lead 27 and binding post 28 to return lead 29 to the commercial line, and as the thermal operator circuit is closed when the motor M starts and remains closed a predetermined time thereafter, a portion of the incoming current passed from binding post 24 by the way of leads 30 and 31 through windings of electro-magnet E to binding post 26 and return lead 29 to the commercial line energizes the magnet before the actuator switch is opened.

The electro-magnet E is provided with a pivoted armature 75 pivoted at 75′ having an extension 76 mounting at its free end an actuating stud 77 which when the armature is closed, by the energizing of the magnet E, is caused to engage the under side of a weighted arm 78 of a bell crank locking lever pivoted at its apex on the pivot pin 79 mounted on the base plate 12 and rotate the same about its pivot. The other arm 80 of the crank lever is provided adjacent its free end with a depression on the side adjacent the motor switch carrier plate to form a latch 81 so that when the motor switch is closed and the magnet E is energized the projecting catch 62 on the motor switch carrier plate is engaged within the depression and held by the latch 81 from counter revolution to open position.

After the parts 62 and 81 engage and lock the motor switch in closed position the actuator switch is opened and as long as the magnet E remains energized it will hold the parts locked, as above described, which will through stud 73 engaging the upper side of the immovable carrier plate 48 of the motor switch and tension of lifting spring 74 maintain the yoke 9 in its uppermost position supporting the primary coil 6 upon its feet 11, as shown in Figure 3.

When the thermal operator circuit is opened, the thermal member T gradually cools, the actuating member 52 having opened the actuator switch is locked from counter revolution by the engagement of the actuating arm 63 with the abutment 61 of the locked motor switch carrier plate 48, and actuating link is allowed to move to the left as the member T cools by the slot 55 passing over the pin 56 on the locked actuating member 52, and place the spring 57 under tension.

From the above, it is seen that in the idle position the weight of the coil 6 depresses the yoke 9 and the thermal member T being cold the arm 63 of the actuator member 52 through the connection 54 with the thermal member T is positioned to hold the motor switch open and the tension of the spring 51 upon the actuating lever 50 also, through engagement with the plate 45, holds the actuator switch 14 closed. When the switch R in the commercial circuit is closed, the circuit is established through the actuator switch 14 and the floating coil 6 of the transformer and at the same time establishes the thermal operator circuit through the thermal member T. The heating of the thermal member T imparts a movement to the arm 63 and the lifting of the yoke 9 allows the motor switch 15 to close after a predetermined time, the length of the delay depending upon the adjustment of the arm 54. The closing of the motor switch 15 energizes the magnet E which causes the arm 80 to engage and lock the motor switch carrier in closed position as long as this circuit is established. The movement of the arm 63 also opens the actuator switch 14 a predetermined time after the closing of the motor switch 15, depending upon the adjustment of the stop 59. The transformer circuit is opened with the opening of the actuator switch 14 and the weight of the de-energized floating coil 6 is supported through the yoke 9 upon the locked motor switch carrier plate 48, so that as soon as the line circuit is open through switch R the carrier plate 48 is released and the weight of the dead coil returns the motor switch to open position.

This control is adapted for many uses, such as controlling the automatic operation of a fluid fuel burner as described in this applicant's said Patent No. 1,881,321, October 4, 1932. By omitting the electro-magnet E and locking arm 80 actuated thereby, the control will intermittently open and close the motor circuit as long as the switch R remains closed, the duration of the intervals depending upon the adjustment of arm 54 and the stop 59, as shown in the diagram in Figure 9. Also the stationary coil might be connected in the line circuit through the actuator switch 14 and the thermal member T connected in circuit with the floating coil without departing from the scope of this invention and without any change in the mechanical operation of the control.

What I claim is:

1. A constant current transformer actuated control for an electric motor interposed in the motor circuit including a normally open switch in the motor circuit in combination with mechanism releasably holding said switch in open position and, when released to close, in closed position, a switch in the primary circuit of the transformer normally closed, whereby the closing of the circuit to the control energizes the transformer and causes one coil to float above the other, and means actuated by the floating of said coil to close the motor switch and thereafter open the switch in the said primary circuit.

2. A constant current transformer actuated control for an electric motor interposed in the motor circuit including a normally open switch in the motor circuit in combination with mechanism releasably holding said switch in open position and, when released to close, in closed position, a switch in the primary circuit of the transformer normally closed whereby the closing of the circuit to the control energizes the transformer and causes one coil to float above the other, means actuated by the floating of said coil to release the motor switch, and means actuated by the passage of current through the secondary circuit of the transformer to close the motor switch and thereafter open the switch in the said primary circuit.

3. A constant current transformer actuated control for an electric motor interposed in the motor circuit including a normally open switch in the motor circuit in combination with mechanism releasably holding said switch in open position and, when released to close, in closed position, a switch in the primary circuit of the transformer normally closed whereby the closing of the circuit to the control energizes the transformer and causes one coil to float above the other, means actuated by the floating of said coil to release the motor switch, a thermal member in the secondary circuit of the transformer, and means actuated by said member when the transformer is energized to close the motor switch.

4. A constant current transformer actuated control for an electric motor interposed in the motor circuit including a normally open switch in the motor circuit in combination with mechanism releasably holding said switch in open position and, when released to close, in closed position, a switch in the primary circuit of the transformer normally closed whereby the closing of the circuit to the control energizes the transformer and causes one coil to float above the other, means including a spring pressed reciprocating member normally held at one end of its movement by the weight of the said coil when the transformer is deenergized and actuated by the floating of said coil to release the motor switch, and means actuated by the passage of current through the secondary circuit of the transformer to close the motor switch.

5. A constant current transformer actuated control for an electric motor interposed in the motor circuit including a normally open switch in the motor circuit in combination with mechanism releasably holding said switch in open position and, when released to close, in closed position, a switch in the primary circuit of the transformer normally closed whereby the closing of the circuit to the control energizes the transformer and causes one coil to float above the other, means including a spring pressed reciprocating member normally held at one end of its movement by the weight of the said coil when the transformer is deenergized and actuated by the floating of said coil to release the motor switch, a thermal member in the secondary circuit of the transformer, and means actuated by said member when the transformer is energized to close the motor switch.

6. A constant current transformer actuated control for an electric circuit interposed in said circuit including a normally open switch in said circuit in combination with mechanism releasably holding said switch in open position and, when released to close, in closed position, a switch in the primary circuit of the transformer normally closed, whereby the closing of the circuit to the control energizes the transformer and causes one coil to float above the other, means actuated by the floating of said coil to close the switch in the circuit to the control, switch operating mechanism for closing and opening the transformer circuit having an actuating member, and a bi-metallic thermal member interposed in the secondary circuit of the transformer having an operative connection to said actuating member normally acting when the secondary circuit is dead to actuate the switch operating mechanism to close the transformer switch and upon the passage of a constant current therethrough actuate the mechanism to open the transformer switch within a known period after the energizing of the secondary circuit.

7. A constant current transformer actuated control for an electric circuit interposed in said circuit including a normally open switch in said circuit in combination with mechanism releasably holding said switch in open position and, when released to close, in closed position, a switch in the primary circuit of the transformer normally closed, whereby the closing of the circuit to the control energizes the transformer and causes one coil to float above the other, means actuated by the floating of said coil to close the switch in the circuit to the control, switch operating mechanism for closing and opening the transformer circuit having an actuating member, and a bi-metallic thermal member interposed in the secondary circuit of the transformer having an operative connection to said actuating member normally acting when the secondary circuit is dead to actuate the switch operating mechanism to close the transformer switch and upon the passage of a constant current therethrough actuate the mechanism to open the transformer switch within a known period after the energizing of the secondary circuit, said period being constant at each operation of the control.

8. A constant current transformer actuated control for an electric circuit interposed in said circuit including a normally open switch in said circuit in combination with mechanism releasably holding said switch in open position and, when released to close, in closed position, a switch in the primary circuit of the transformer normally closed, whereby the closing of the circuit to the control energizes the transformer and causes one coil to float above the other, means actuated by the floating of said coil to close the switch in the circuit to the control, switch operating mechanism for closing and opening the transformer circuit having an actuating member, and a bi-metallic thermal member interposed in the secondary circuit of the transformer having an adjustable operative connection to said actuating member normally acting when the secondary circuit is dead to actuate the switch operating mechanism to close the transformer switch and upon the passage of a constant current therethrough actuate the mechanism to open the transformer switch within a known period after the energizing of the secondary circuit, whereby adjustment of the operative connection to the thermal element predetermines the length of said period.

9. A constant current transformer actuated control for an electric circuit interposed in said circuit including a normally open switch in said circuit in combination with mechanism releasably holding said switch in open position and, when released to close, in closed position, a switch in the primary circuit of the transformer normally closed, whereby the closing of the circuit to the control energizes the transformer and causes one coil to float above the other, means actuated by the floating of said coil to close the switch in the circuit to the control, switch operating mechanism for closing and opening the transformer circuit having an actuating member, a bifurcated strip of bi-metallic electrical resistance having its respective feet fixed and connected in the secondary circuit of the transformer and having an operative connection from the free end of the strip to said actuating member normally acting when the secondary circuit is dead to actuate the switch operating mechanism to close the transformer switch and upon the passage of a constant current therethrough actuate the mechanism to open the transformer switch, within a known period after the energizing of the secondary circuit.

10. The structure of claim 1 including means actuated upon the closing of the motor switch to open the second switch.

11. The structure of claim 1 including means actuated upon the closing of the motor switch to lock the motor switch closed and additional means to thereafter open the second switch.

12. The structure of claim 1 wherein the actuated means includes means to delay the closing of the motor switch after the establishment of the transformer circuit.

13. In an electric circuit, a control therefor including a normally open control switch in said circuit, a constant current transformer, means for establishing a circuit therethrough, and means actuated by the floating of a transformer coil to close the control switch.

14. The structure of claim 13 including means actuated by the establishment of the circuit through the control switch to lock said control switch in closed position.

15. The structure of claim 13 including means actuated by the establishment of the circuit through the control switch to lock said switch in closed position and additional means acting upon the closing of the control switch to discontinue the circuit through the transformer.

16. In a control for an electric circuit, the combination of a constant current transformer having a floating coil, means to establish an electric circuit to energize said transformer, a switch in the circuit to be controlled, mechanism releasably holding said switch in open position and, when released to close, in closed position, means to close said switch when the floating coil is dead and release said switch to close when the coil is floating, a bi-metallic thermal member interposed in the secondary circuit of the transformer, a switch in the primary circuit of the transformer, switch operating mechanism to open and close the primary switch, including an actuator having an adjustable operative connection to the thermal actuator, and means allowing the released switch in the circuit to be controlled to close only through movement of the switch actuator, whereby constant periods may be established between the opening and closing of the primary switch and in maintaining the said switch in the circuit to be controlled open and closed.

IRA E. McCABE.